United States Patent
Halligan et al.

(10) Patent No.: US 7,565,581 B1
(45) Date of Patent: Jul. 21, 2009

(54) ERROR HANDLING POLICY

(75) Inventors: Kenneth A. Halligan, Leominster, MA (US); Michael Scharland, Franklin, MA (US); David Joshua Brown, Chelmsford, MA (US); Patrick Brian Riordan, Watertown, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 531 days.

(21) Appl. No.: 10/948,514

(22) Filed: Sep. 23, 2004

(51) Int. Cl.
*G06F 11/00* (2006.01)

(52) U.S. Cl. .............. 714/51; 714/706; 714/6

(58) Field of Classification Search .......... 714/57, 714/51, 706
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,914,967 A * | 6/1999 | Yomtoubian | 714/718 |
| 6,199,074 B1 * | 3/2001 | Kern et al. | 707/204 |
| 6,334,193 B1 * | 12/2001 | Buzsaki | 714/2 |
| 6,549,921 B1 * | 4/2003 | Ofek | 707/204 |
| 6,754,682 B1 * | 6/2004 | LeCrone et al. | 707/204 |
| 7,120,824 B2 * | 10/2006 | Burton et al. | 714/6 |
| 7,127,636 B2 * | 10/2006 | Werner et al. | 714/6 |
| 7,171,583 B2 * | 1/2007 | Werner | 714/6 |
| 7,197,663 B2 * | 3/2007 | Carberry et al. | 714/6 |
| 7,200,779 B1 * | 4/2007 | Coss et al. | 714/48 |
| 2005/0055602 A1 * | 3/2005 | Werner et al. | 714/5 |
| 2005/0114740 A1 * | 5/2005 | Carberry et al. | 714/42 |
| 2005/0188165 A1 * | 8/2005 | Wolfgang et al. | 711/162 |
| 2005/0283655 A1 * | 12/2005 | Ashmore | 714/7 |

OTHER PUBLICATIONS

Microsoft Computer Dictionary 4th Ed., Microsoft Press, 1999, pp. 28,107.*

* cited by examiner

*Primary Examiner*—Christopher S McCarthy
(74) *Attorney, Agent, or Firm*—Muirhead and Saturnelli, LLC

(57) ABSTRACT

Described are techniques for use with an error handling policy for a data storage system. Error handling criteria may be specified for controlling behavior of the data storage system upon the occurrence of an internal processing error occurring when performing an ancillary task associated with a data operation received by the data storage system. The error handling criteria may include a threshold counter value, and one or more of: a device, a specific device location or address, and a host. An error may be conditionally returned to the host upon the occurrence of an internal processing error in accordance with the error handling criteria.

32 Claims, 8 Drawing Sheets

| HOST, DEVICE, LBA | COUNTER VALUE | CURRENT ERROR COUNT | TIME |
|---|---|---|---|
| HOST1, DEV1, LBA 2 | 20 | 5 | 11:00 APR 9 2003 |
| HOST1, DEV1, LBA 30 | 5 | 3 | 10:00 APR 10 2003 |
| .. .. .. | .. .. .. | .. .. .. | .. .. .. |

FIGURE 6

| HOST, DEVICE, LBA | COUNTER VALUE | CURRENT ERROR COUNT | TIME |
|---|---|---|---|
| HOST1, DEV1, LBA 2 | 20 | 5 | 11:00 APR 9 2003 |
| HOST1, DEV1, LBA 30 | 5 | 4 | 11:00 APR 10 2003 |
| .. .. .. | .. .. .. | .. .. .. | .. .. .. |

FIGURE 7

ERROR HANDLING POLICY

BACKGROUND

1. Technical Field

This application generally relates to error handling, and more particularly to techniques for defining an error handling policy in connection with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. For example, a point in time copy of data stored on a first data storage system may be maintained on a second data storage system. A write operation received from a host may be processed by the first data storage system in what may be characterized as multiple phases. A first phase may be processing associated with maintaining the point in time copy on the second data storage system. Steps of this first phase may be performed by an ancillary task. The second phase may be associated with performing the write operation by updating the data copy on the first data storage system in accordance with new data of the received write operation. Operations performed by the ancillary task related to the host write operation in connection with creating the point in time copy on the second data storage system may be characterized as internal operations with respect to the data storage systems, for example, since such operations may be controlled by the first data storage system and may be performed without knowledge of a host issuing the write operation. The foregoing is just one example of how a user on a host may perform a first operation such as, for example, a read or write operation in connection with a data storage system, and other resulting internal processing an ancillary task of the data storage systems may be performed. If an error occurs in connection with the resulting internal processing associated the received host write operation, such as the processing in connection with maintaining the point in time copy of the data, errors may subsequently be returned to the host causing a host failure or host system "crash", or may cause the host to continuously retry the data operation. The user on the host may have no knowledge regarding the cause of the internal error(s) and may desire to continue with its own processing despite the occurrence of the internal errors of the ancillary processing without continuously retrying the data operation and/or without causing failure of the host.

Thus, it may be desirable to provide the host with control in establishing an error handling policy in connection with the resulting internal processing of the data storage system associated with a data operation received from the host. Such an error handling policy may provide the host with the option of specifying conditions under which the host would prefer not have an internal error of the data storage system caused by ancillary processing affect continued host processing. For example, such an error handling policy may provide the host with the option of having continuous data availability (such as continued access to the first data storage system) despite the occurrence of any resulting internal error (such as in connection with maintaining the data copy on the second data storage system).

SUMMARY OF THE INVENTION

In accordance with one aspect of the invention is a method for performing error handling in accordance with an error handling policy in a data storage system comprising: receiving, at the data storage system, error handling criteria including a threshold condition; receiving, at the data storage system, a data operation request from a host wherein an internal processing error of the data storage system occurs in connection with performing an ancillary task associated with the data operation request; determining if said threshold condition has been reached; and processing the internal processing error in accordance with the error handling criteria, wherein, an error condition is returned to the host if said threshold condition has not been reached. The error handling criteria may include a first indicator associated with a device of the data operation request corresponding to the internal processing error. The device may be associated with a plurality of error handling policies, each of said plurality of policies having one or more error handling criteria. The device may be associated with a first error handling policy and a second error handling policy, the first error handling policy including a device indicator and first ancillary task identifier corresponding to a first ancillary task executing in the data storage system, the second error handling policy include the device indicator and a second ancillary task identifier corresponding to a second ancillary task executing in the data storage system. The device may be a physical device or a logical device. The error handling criteria may include a second indicator associated with the host issuing the data operation request corresponding to the internal processing error. The error handling criteria may include a third indicator associated with a device location included in the data operation request corresponding to the internal processing error. The data operation request may be a first write operation and the internal processing error may occur as a result of the first data storage system failing to perform a second write operation to a second data storage system prior to performing the first write operation. The ancillary task may maintain a point in time copy of data from the first data storage system on the second data storage system. The error handling criteria may be sent from a host to the data storage system using an application programming interface. The error handling criteria may be specified in accordance with at least one input parameter of the application programming interface. The error handling criteria may be specified using a configuration file of the data storage system. The threshold condition may be a cumulative error count incremented with each occurrence of an internal processing error, said error handling criteria including a time period, said cumulative error count being reinitialized if an internal processing error has not occurred within an amount of time specified by said time period. The error handling criteria may include a timestamp indicator, said timestamp indicator being updated with a current time value each time said cumulative error count is updated, and the method may further include determining, using said timestamp indicator, if an internal processing error has occurred within said amount of time. The internal processing error may be a type of internal processing error which the host may elect not to receive in accordance with said error handling criteria, said ancillary task may be able to produce other internal processing errors of another type about which a host is notified independent of said error handling criteria. The error handling criteria may include a range of device locations associated with said first indicator for a device.

In accordance with another aspect of the invention is a computer program product for performing error handling in accordance with an error handling policy in a data storage system comprising code that: receives, at the data storage system, error handling criteria including a threshold condition; receives, at the data storage system, a data operation request from a host wherein an internal processing error of the data storage system occurs in connection with performing an ancillary task associated with the data operation request; determines if said threshold condition has been reached; and processes the internal processing error in accordance with the error handling criteria, wherein, an error condition is returned to the host if said threshold condition has not been reached. The error handling criteria may include a first indicator associated with a device of the data operation request corresponding to the internal processing error. The device may be associated with a plurality of error handling policies, each of said plurality of policies having one or more error handling criteria. The device may be associated with a first error handling policy and a second error handling policy, the first error handling policy including a device indicator and first ancillary task identifier corresponding to a first ancillary task executing in the data storage system, the second error handling policy include the device indicator and a second ancillary task identifier corresponding to a second ancillary task executing in the data storage system. The device may be a physical device or a logical device. The error handling criteria may include a second indicator associated with the host issuing the data operation request corresponding to the internal processing error. The error handling criteria may include a third indicator associated with a device location included in the data operation request corresponding to the internal processing error. The data operation request may be a first write operation and the internal processing error may occur as a result of the first data storage system failing to perform a second write operation to a second data storage system prior to performing the first write operation. The ancillary task may maintain a point in time copy of data from the first data storage system on the second data storage system. The error handling criteria may be sent from a host to the data storage system using an application programming interface. The error handling criteria may be specified in accordance with at least one input parameter of the application programming interface. The error handling criteria may be specified using a configuration file of the data storage system. The threshold condition may be a cumulative error count incremented with each occurrence of an internal processing error, said error handling criteria including a time period, said cumulative error count being reinitialized if an internal processing error has not occurred within an amount of time specified by said time period. The error handling criteria may include a timestamp indicator, said timestamp indicator being updated with a current time value each time said cumulative error count is updated, the computer program product may further comprising code that: determines, using said timestamp indicator, if an internal processing error has occurred within said amount of time. The internal processing error may be a type of internal processing error which the host may elect not to receive in accordance with said error handling criteria, said ancillary task may be able to produce other internal processing errors of another type about which a host is notified independent of said error handling criteria. The error handling criteria may include a range of device locations associated with said first indicator for a device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6 and 7 are representations of a counter table at different points in time in an example illustrating an error handling policy with the techniques described herein.

DETAILED DESCRIPTION OF EMBODIMENT(S)

Figure 1:
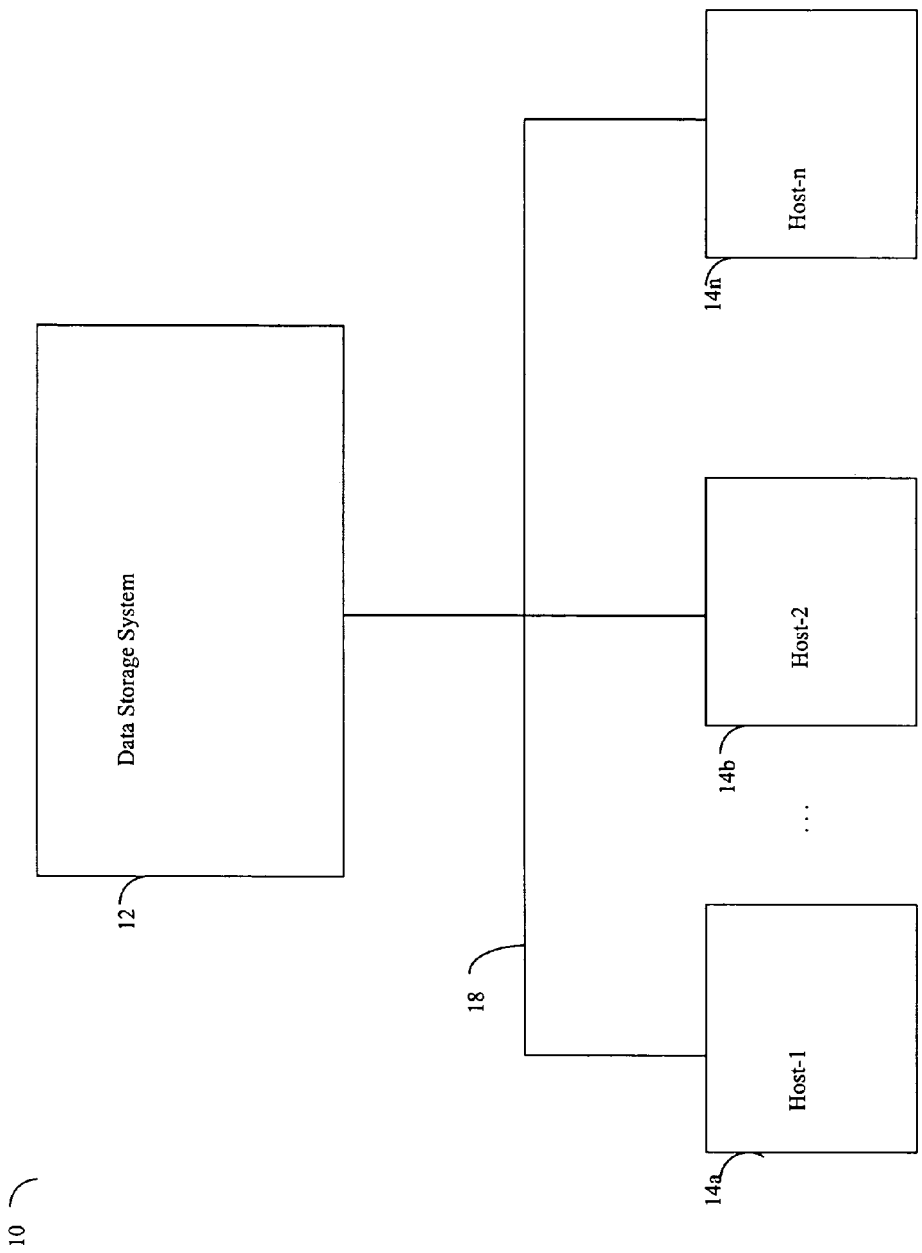
FIG. 1 is an example of an embodiment of a computer system according to the present invention.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
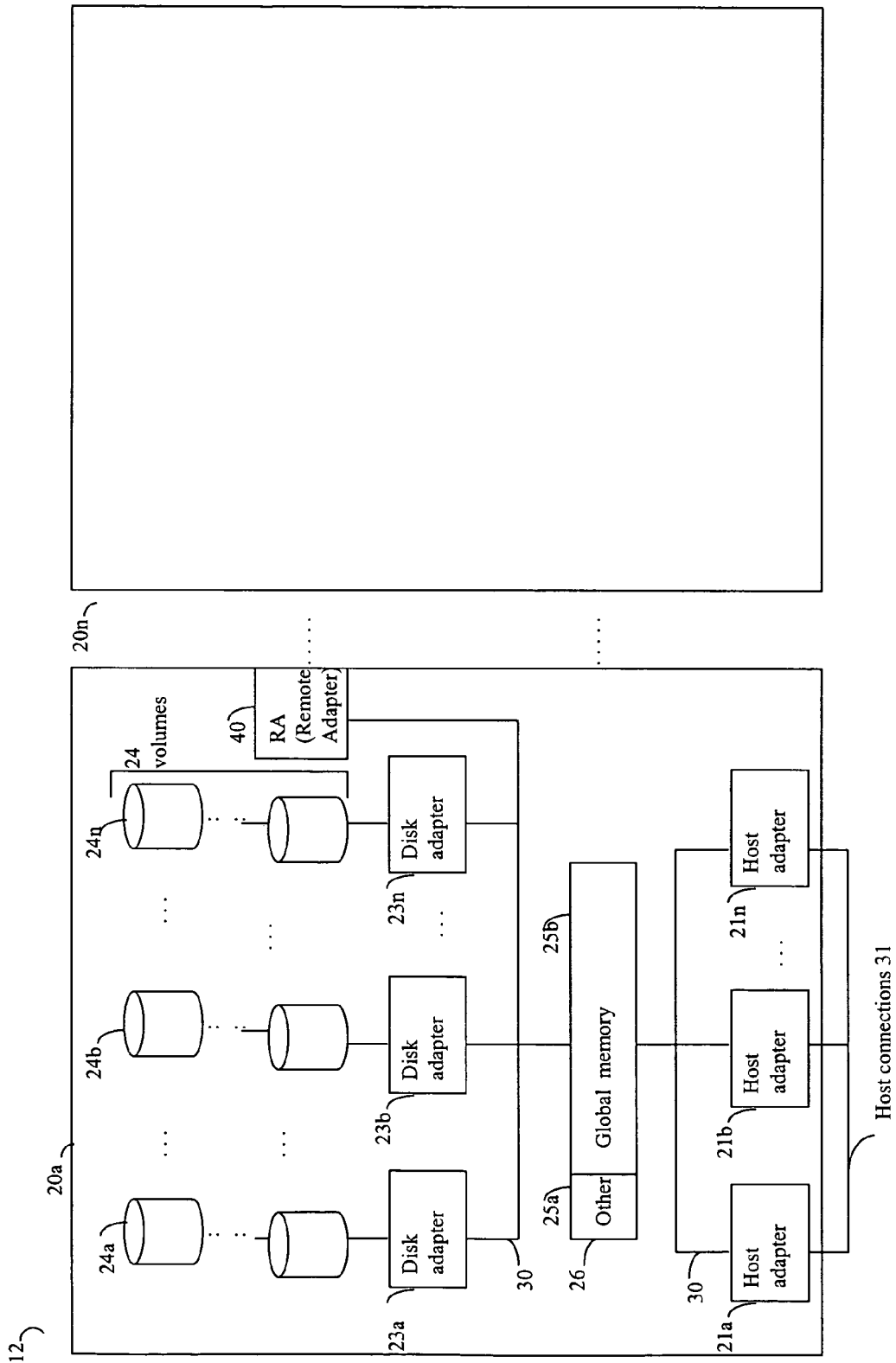
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
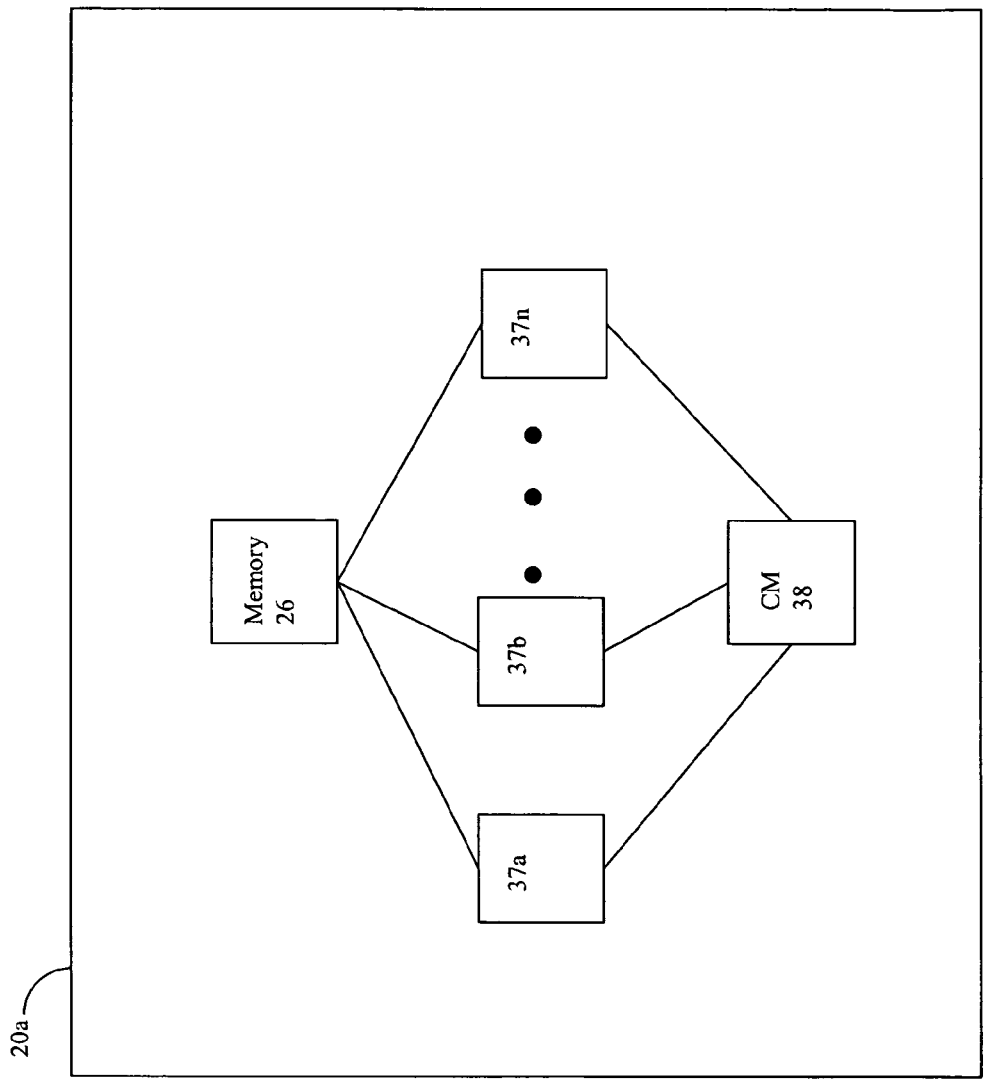
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG.

2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
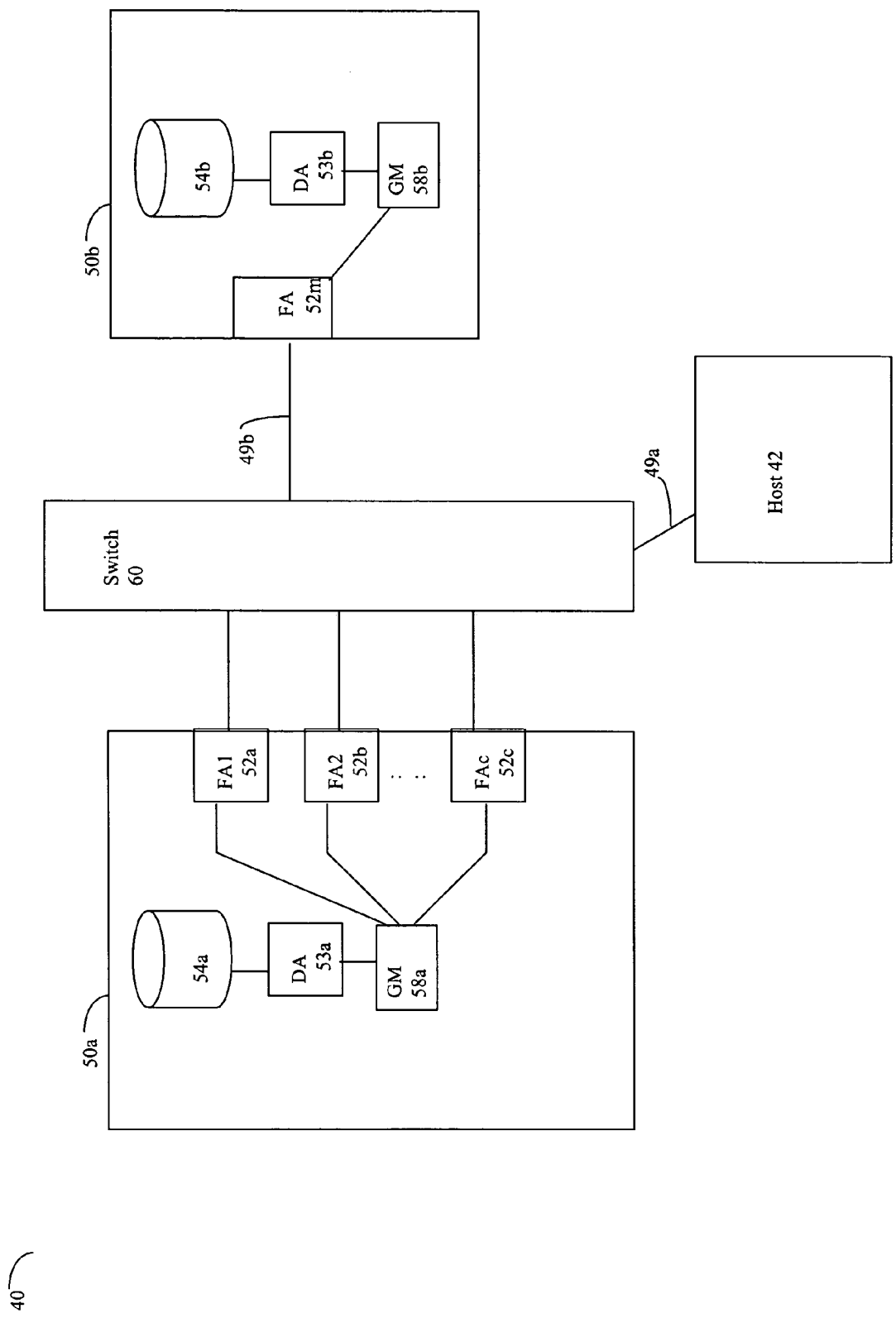
FIG. 3 is a simplified illustration of an example of an embodiment of the computer system of FIGS. 1 and 2.

Referring now to FIG. 3, shown is an example of an embodiment of a computer system 46 illustrating the relationship between a host 42, a first data storage system 50a, and a second data storage system 50b. It should be noted that the embodiment illustrated in FIG. 3 is a simplified view of components of a computer system, for example, including only some detail of the data storage systems 50a and 50b for the sake of illustration. In this example, the HA may be a Fibre Channel Adapter (FA) 52a. A user on the host 42 may issue a command to data storage system 50a over connection 49a to the FA 52a. The data storage system 50a may communicate with data storage system 50b over connection 49b using FA 52a and FA 52c. Data may be copied from data storage system 50a to 50b over connection 49b.

In connection with the example 40 of FIG. 3, processing may be performed to maintain a point in time copy of the data from device 54a on remote device 54b. As part of maintaining this copy, processing may be performed within the data storage system 50a to copy the data to system 50b while the devices, such as 54a, are accessible on line to the host system 42. In other words, a point in time copy of 54a is made to 54b. While this copy of 54a is being made, the host 42 may also perform data operations, such as data reads and writes, to the device 54a. In one embodiment, with reference to FIG. 3, the Fibre Channel adapter 52a may execute code to perform the copying of data from 54a to 54b. Data may be copied from 54a by DA 53a to GM (Global Memory) 58a. Data from GM 58a may then be communicated to FA 52a which sends data to FA 52c. FA 52c then places the data in GM 58b. DA 53b may then transfer the data from GM 58b to the device 54b. The foregoing copying in connection with creating a point in time copy of device 54a on device 54b may be performed while the device 54a is online and available for use by host 1 42, such as in connection with performing read and/or write operations.

In connection with creating a point in time copy when a write operation is issued from the host 42, an embodiment may copy data from a source location on device 54a to a target location on device 54b prior to accepting the new data from the host included in the write operation if the data at the source location has not yet been copied to the target location. With reference to FIG. 3, the host 42 may issue a write operation to a first location on device 54a. This may be the first write request to that first location since the command was issued to create a point in time copy of device 54a (or portion thereof) on device 54b. The data from the first location on device 54a is copied to a target location on device 54b prior to applying the write operation to the data on device 54a. An internal processing error may occur in connection with writing the data from 54a to 54b for maintaining the point in time copy, and may result in an error returned to the host 42. Although the error occurred in maintaining the point in time copy, the error returned to the host may indicate that the host write operation has failed.

What will now be described are techniques that may be used in connection with defining and implementing an error handling policy (EHP). The EHP may provide the host with control in establishing a policy in connection with the resulting internal or subsequent processing performed by the data storage system. An EHP may provide the host with the option of specifying conditions under which the host would prefer not have an internal processing error of the data storage system affect continued host processing. For example, such an error handling policy may provide the host with the option of having continuous data availability (such as continued access to the first data storage system to perform other read and/or write operations) despite the occurrence of any resulting internal processing error of the data storage system (such as in connection with maintaining the point in time copy on the second data storage system).

A user on a host may define policy conditions in accordance with those acceptable by each host. For example, a particular host and associated operating system may result in a host failure or "crash" upon the host receiving more than four failed I/O operation errors from the data storage system within a predetermined time period. In accordance with a host EHP and with reference to FIG. 3, the host may also desire to continue with its processing and have continued access to device 54a despite internal processing errors that may occur in maintaining and/or creating the point in time copy on device 54b. Such a policy may be defined which is acceptable and within the tolerance limits of the host. In other words, the host may define an EHP which allows the host to continue with subsequent I/O operations rather than fail due to particular conditions, such as internal data storage system processing errors encountered in connection with maintaining a point in time copy. The host may define conditions of an EHP in accordance with the foregoing and other acceptable limits and/or conditions that may vary with each embodiment. With use of an EHP for a data storage system, a user on a host may make a choice as to when certain internal processing errors caused by ancillary processing related to a host I/O operation are not to be reported to the host. In one example, this choice may be a selection between either maintaining a point in time copy of a data set, or having a host fail due to a received error message from the data storage system.

It should be noted that the foregoing is just one example illustration of when internal processing errors of an ancillary task associated with a received host I/O operation may occur within a data storage system. When such internal processing errors occur, the host may desire an EHP which enables it to continue with future I/O operations rather than experience a host failure for particular conditions, such as the occurrence of internal processing errors that may be specified in the EHP. What will now be described are examples of how an EHP may be defined and used.

As described herein, the internal processing is performed by an ancillary task related to, and in response to, a received host I/O operation. One example of such an ancillary task is the processing associated with maintaining of a point in time copy of a data set. Other ancillary tasks may also be performed in addition to, or instead of, those described herein. Internal processing errors caused by an ancillary task may be of a variety of different error types. An embodiment may include internal processing errors of one or more types which are always reported to the host and are, thus, not under the control of a host's EHP. Accordingly, there may be some internal processing errors of an ancillary task which may be reported to the host despite a host's EHP. Such errors which may always be reported to the host may include those, for example, of a particular severity level. The types of internal processing errors of a data storage system which a user on a host may not waive receiving via the EHP may vary in accordance with each ancillary task and other aspects of an embodiment, such as the particular hardware and/or software used therein.

It should be noted that an ancillary task may or may not be required to complete a host I/O operation. In other words, depending on the particular host I/O operation and ancillary task, the success or failure of the host I/O operation may depend on whether the ancillary task is able to successfully complete. For example, if the host I/O operation is a write operation and the ancillary task is maintaining a point in time copy on another data storage system, success of maintaining the point in time copy is not required for completion of the write operation. In contrast, the host I/O operation may be a read operation and the ancillary task may be copying data from another data storage system to return to the host (such as, for example, in connection with a data pull operation where the source of the read operation is in a second, remote data storage system). Completion of the ancillary task is required in order to successfully complete the read operation returning data to the host. The particular ancillary task may vary with each embodiment and I/O operation.

In one embodiment, a counter may be used in specifying a number of times a data storage system communicates an error to the host resulting from internal processing within the data storage system prior to the data storage system determining that an overall task or operation associated with the internal processing has failed. It should be noted that as described herein, the internal processing of the data storage system may cause an internal error condition. This internal processing error condition may be characterized as one resulting from subsequent processing, with respect to an initial host I/O operation, which is performed by the data storage system. The subsequent processing may bear no relation on whether the initial host I/O operation is able to succeed. Rather, the subsequent processing may be included in processing steps of other operations or tasks performed by the data storage system such as may be associated, for example, with maintaining a point in time copy of a data set to which the host is performing I/O operations. The host may have no knowledge and/or no control of the subsequent processing performed by the data storage system in response to the host's initial I/O operation or other request. The value associated with the counter indicates a number of times that an error occurs as a result of the internal processing that may be performed by a data storage system in connection with some other task or operation besides the host I/O operation. In the embodiment described herein, the internal processing may be performed by the data storage system subsequent to receiving a host I/O operation. The outcome (success or failure) of the host I/O operation may be independent of the error encountered when performing the data storage system internal processing task, such as an error encountered in connection with the internal operations performed by the data storage system for maintaining a point in time copy.

The counter may be a storage location, for example, in a portion of global memory of a data storage system, such as GM 58a of data storage system 50a, having a counter value indicating a limit or threshold number of times that the data storage system communicates an error resulting from internal data storage system processing to the host prior to the data storage system determining that a task or operation associated with the internal processing has failed. In this embodiment, the counter corresponds to the internal processing errors of an ancillary task associated with a received host I/O operation, such as maintaining a point in time copy, in which the internal processing errors may be characterized as those which the host may waive receiving. If an error occurs which is either not a waivable internal processing error of the ancillary task, or is otherwise not an error resulting from internal processing, for example, a write operation error when accepting the new data from the host and updating the data copy on the first data storage system, then the error condition is not accounted for by the counter. Even if the counter value=1, indicating an EHP electing not to report internal processing errors of the ancillary task to the host, the host may receive other types or classes of errors, such as failure to write the data to 54a in accordance with the host write operation request, and any other non-waivable internal processing errors.

The counter threshold value may be set in any one or more different ways. For example, a value for the counter may be set initially, and/or reset from the host using an API (application programming interface). The threshold value for the counter may be communicated as an input parameter of the API. In one embodiment, a user may specify the threshold value using an API. The API may then result in one or more system calls (SYS calls) between the host and a data storage system. The threshold value for the counter may be also specified in a static and/or dynamic configuration file for the data storage system. A static configuration file may be, for example, one that is read when the data storage system is brought online as part of initialization. A dynamic configuration file may be used to specify values that may change while the data storage system is in operation so that a particular data storage system parameter may be updated without reinitialization of the data storage system. Other embodiments may use other techniques in connection with specifying a counter value.

In one embodiment, a counter value, such as zero (0), may be used to indicate that all failed internal operations are communicated to the host. Additionally, with a counter=0, the EHP does not specify conditions under which the data storage system determines that an ancillary task for which the internal processing is being performed has failed. For values greater than zero (0), the counter indicates a number of times the failed internal processing is reported to the host prior to the data storage system determining that another task for which the internal processing is being performed has failed. In the embodiment described herein, a counter value of "n", n>0, indicates that up to "n−1" internal processing errors are reported to the host prior to the data storage system indicating that another ancillary task or operation has failed. For example, if the counter=1, no errors associated with a failed internal processing are reported back to the host and the data storage system determines that the ancillary task associated with the internal processing has failed. If the counter=10, up to and including 9 internal processing errors are reported back to the host prior to determining that the ancillary task associated with the internal processing has failed.

An embodiment may associate each counter with criteria in addition to a counter value as described above. The different variations in which criteria may be associated with counters provides flexibility in associating counters with different host transaction groupings. In one embodiment, a counter may be associated with a physical or logical device. The device associated with the counter may represent the device specified in a data operation request by a data storage system. Associating a counter on a per device level may be used in determining that an ancillary task has failed as a result of I/O operations from different hosts and/or different data files to a same device. Thus, I/O operations from different hosts but associated with a common device may be grouped together in an EHP. A counter may also be associated with a device and host combination in which the host is the host issuing an I/O request and the device is specified in the host I/O request. This second option of the host and device combinations provides a more refined granularity such that the internal processing results for a first host's I/O request will not affect the internal processing results of a second different host's I/O request. A counter may also be associated with a third option, a device, host, and device location or logical block address (LBA) combination. Using this third option associates a counter, for example, with each of different I/O commands or I/O operations. For example, the third option may be used to associate a counter with an I/O command, and retries to execute the I/O command, for writing to a user data file. The third option associates a counter with each command and retries of the same command by a host.

It should be noted that an embodiment may including varying combinations of the foregoing. For example, an embodiment may associate a single counter with a device, a device and device location, a device and host, or a host, device and device location. An embodiment may also associate a single counter with one or more device locations all of which may or may not be contiguous. For example, multiple device locations may be specified in the form of a range of LBAs. A counter may be associated with one or more of these ranges. Specification of multiple device locations as may be included in a range may be performed in any one or more different ways depending on the particular use within an embodiment. For example, in one embodiment, the device locations may be produced using an automated tool identifying bad device sectors or blocks. A group of identified bad sectors or blocks may be associated with an EHP and associated counter.

A counter may also be associated with an ancillary task identifier. The ancillary task identifier may uniquely define an ancillary task in a data storage system and may be used in varying combinations with other criteria, such as an ancillary task identifier and device. In one embodiment, there may be one or more EHPs for a single device on a data storage system local to a host. For example, there may also be multiple ancillary tasks for a particular device in a local data storage system in which multiple different point in time copies are maintained on remotely located devices for a same device on the local data storage system. An embodiment may associate a single EHP with each device and ancillary task identifier. An embodiment may also include other criteria than as described herein.

In one embodiment, the counter value or threshold and other associated counter criteria may be specified using an API, a static configuration file, a dynamic configuration file, and/or other techniques. This information may be characterized as the counter configuration information and may be stored in a portion of global memory. The counter configuration information, possibly along with other configuration information that may vary with each embodiment, may be stored in each data storage system in a portion of global memory in a configuration area and may be accessed by one or more executing tasks in a data storage system.

It should be noted that the counter configuration information, and other resources described herein (such as the counter table described in following paragraphs), may be characterized as shared resources. Access to the shared resources may be synchronized using any one of a variety of different techniques, such as locking, known to those of ordinary skill in the art as may be available in an embodiment.

In one embodiment, the counter values or thresholds, current error counts representing a number of internal processing errors that have occurred over a time period, and other counter criteria may be included in a counter table stored in global memory. Upon the determination of an internal processing error for which a counter has been defined, a determination is made as to whether there is an existing entry in the counter table. If so, the current entry is updated to reflect the additional internal processing. Otherwise, a new entry is made in the counter table. In connection with updating the counter table, counter configuration information may be accessed and subsequently included in the counter table.

Figure 4:
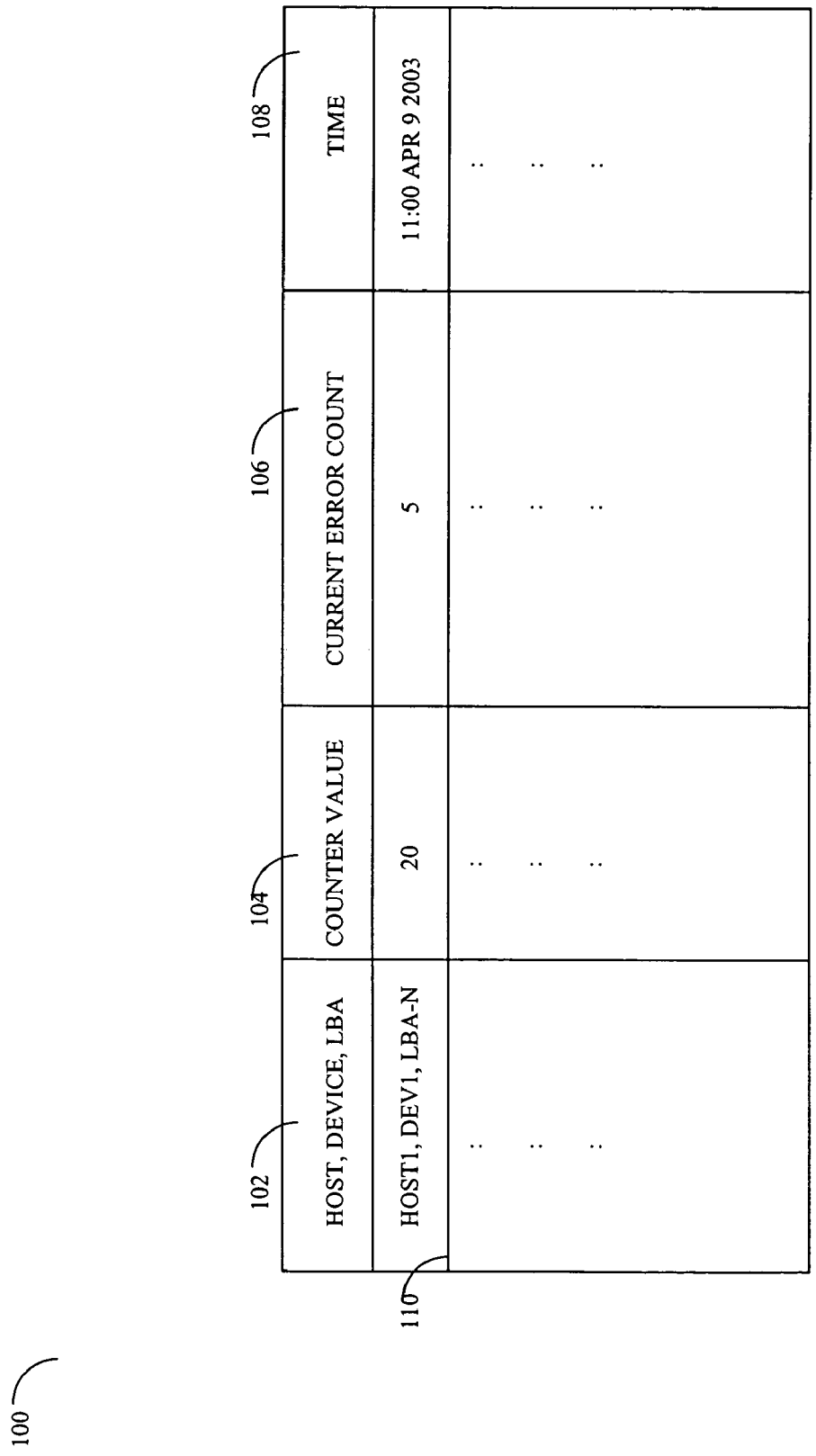
FIG. 4 is an example representation of one embodiment of a counter table.

Referring now to FIG. 4, shown is an example representation 100 of a counter table that may be included in an embodiment. The table includes four columns with a row entry for each counter and associated criteria. Columns 102 and 104 specify the counter criteria that may be defined, for example, using an API, configuration file and/or other techniques as described elsewhere herein. Column 102 specifies a first portion of the counter criteria. In this example, the first portion of counter criteria is the host, device, and LBA combination as set forth in the third option described above. Other criteria may be specified in 102, for example, using only the device, the host and device combination, device and ancillary task identifier, or other criteria as may be used in an embodiment. Column 104 specifies a second portion of the criteria which is counter value, "n", indicating a limit or threshold value for the counter, as described above, which is associated with an entry in the table. With reference to entry 110, the counter value is 20 indicating that up to and including 19 internal processing errors are reported back to the host prior to determining that the ancillary task, such as maintaining the point in time copy, associated with the internal processing errors has failed/is aborted. Column 106 is a current error count value indicating the current number of errors determined for the counter associated with a table entry. The value(s) in 106 change over time as additional internal processing errors may occur. Additionally, the current error count in 106 may be reset or reinitialized using a timer as described elsewhere herein. Column 108 indicates a time, such as a timestamp value, associated with the last occurrence of an error for this particular counter indicating the last time the associated current error count in 106 has been updated.

An embodiment may store the counter table in global memory of a data storage system. The counter table may be implemented as any one of a variety of different data structures known to those of ordinary skill in the art. In one embodiment, the counter table 100 may be implemented as a two-dimensional array which is a fixed size. When all entries in the table are used, any attempt to add a new entry may result in the data storage system determining that an ancillary operation associated with the internal processing error has failed. An embodiment may also select an entry for reuse in accordance with the oldest time value. If there are no free entries, the entry having the oldest time value in 108 may be selected for reuse. Other embodiments may perform other processing in accordance with the foregoing condition when there are no entries available for use in the table.

Figure 5:
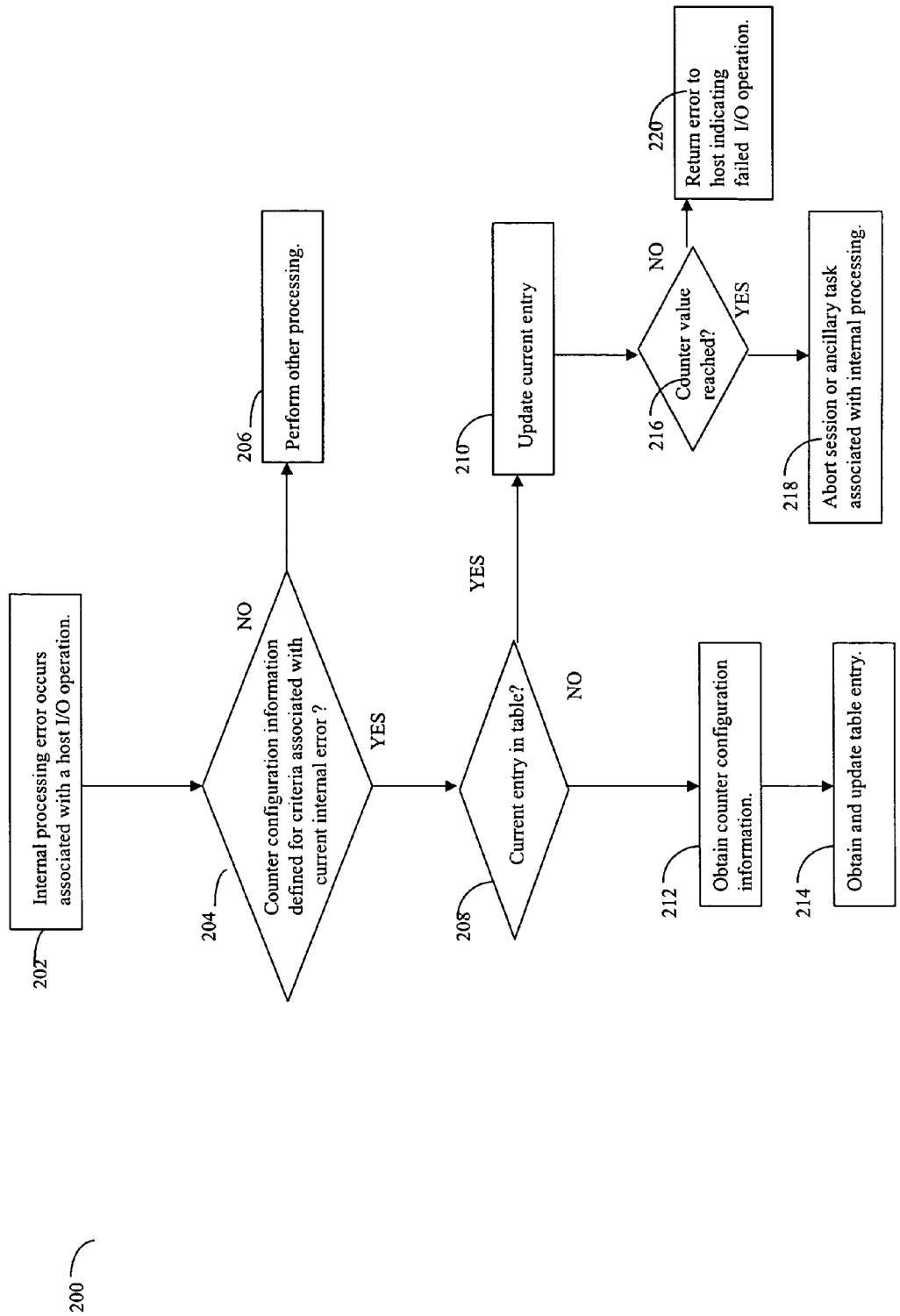
FIG. 5 is an flowchart of processing steps of one embodiment for handling an internal processing error within a data storage system using an error handling policy.

Referring now to FIG. 5, shown is a flowchart 200 of processing steps that may be performed by a data storage system in connection with handling an internal processing error associated with an ancillary task. As described above, an internal processing error may occur, for example, when the first data storage system attempts to push a copy of existing data to the second data storage system, upon which a point in time copy of the existing data is stored, prior to accepting the new data from the host replacing the existing data. Processing of flowchart 200 summarizes the steps described above. Code may be executed by a processor within the data storage system to perform the processing steps of flowchart 200. The code may be stored in any one of a variety of computer-readable forms from, for example, a disk, a form of memory, and the like known to those of ordinary skill in the art. At step 202, an internal processing error occurs associated with a host I/O operation. At step 204, a determination is made as to whether counter configuration information is defined for criteria associated with the current internal processing error. If step 204 evaluates to no, control proceeds to step 206 to perform other processing for handling the internal processing error. If step 204 evaluates to yes, control proceeds to step 208 to update the counter table. As an example, if an internal processing error occurs for a host I/O operation associated with "DEVICE FOO" and counter configuration information is defined for DEVICE FOO, then step 204 evaluates to yes and the counter table is then updated in accordance with the current internal processing error.

At step 208, a determination is made as to whether there is a current entry in the table for a counter associated with the current internal processing error. If so, control proceeds to step 210 to update the current entry. As described above, this may include, for example, updating a current error count and an associated time value. A determination is made at step 216 as to whether the counter value or threshold for the current entry has been reached. If not, control proceeds to step 220 to return an error to the host indicating an error condition occurred when performing the I/O operation. The host may then retry the I/O operation. Otherwise, if step 216 evaluates to yes, control proceeds to step 218 where the data storage system aborts the session or ancillary task associated with the internal processing error. In this example the ancillary task or session is in connection with maintaining a point in time copy of the existing data of the first data storage system.

Otherwise, if step 208 evaluates to no, control proceeds to step 212 to obtain the counter configuration information for the counter associated with the current internal processing error. The counter configuration information for the counter may be, for example, the counter criteria including the counter value or threshold corresponding to the host I/O operation of the internal processing error from step 202. Control proceeds to step 214. Step 214 includes determining a next free or available entry from the counter table, and then updating that entry in accordance with the internal processing error and counter configuration information.

It should be noted that an embodiment may perform other processing steps in connection with maintaining the counter table than as described herein with flowchart 200 of FIG. 5. For example, the order of steps 204 and 208 may be swapped. More specifically, an embodiment may perform step 202 and then step 208 to determine if there is a current entry in the table corresponding to the internal processing error. If step 208 evaluates to yes, then steps 210, 216 and other subsequent steps flowing from 216 may be conditionally performed. If step 208 evaluates to no, the embodiment may then perform step 204. If step 204 evaluates to yes, then steps 212 and 214 may be performed. Otherwise, if step 204 evaluates to no, step 206 may be performed.

An embodiment may also define an EHP using a timer. A timer may be associated with one or more counters. The timers and associated values may also be stored with the configuration information and/or in the counter table as described elsewhere herein. The timer specifies a time interval used by the data storage system to determine when to reset the associated one or more counters. If an associated counter has not been incremented (indicating that no internal processing error has occurred) within a time period specified by the timer value, the data storage system may reset or reinitialize the associated counter(s) (such as reset the current error count in column 106 of table 100). Use of the timer in combination with one or more associated counters provides for defining an EHP which allows a threshold number of internal processing errors to occur within each predetermined time period specified by the timer. For example, if a counter has an associated timer value of 4 seconds, the data storage system may reset or effectively only consider as cumulative any internal processing errors that have occurred within a 4 second time period. In one embodiment, steps may be executed within a data storage system to reset counters within a counter table in accordance with timer values.

What will now be described is a more detailed example illustrating the techniques described herein in connection with an EHP. The example is described in connection with FIGS. 6 and 7 in following paragraphs. FIGS. 6 and 7 include a snapshot of a counter table in an embodiment at different points in time. In this example, a write request is received at a first data storage system from HOST1 for DEVICE 1 (DEV1) at LBA 30. Prior to performing the write request, the first data storage system attempts to push the existing data at LBA 30 of DEVICE 1 to another device on a second remote data storage system. A point in time copy is being maintained on the second data storage system. The second data storage system does not respond at the attempt to push the data from DEVICE 1 of LBA 30 causing an internal processing error to be determined by the first data storage system.

Referring now to FIG. 6, shown is an example 300 of a counter table representing a counter table state prior to update in accordance with the internal processing error described above. The first data storage system may determine that entry 312 of the table 300 is a match for the internal processing error and entry 312 of FIG. 6 may be updated to the state of FIG. 7. Element 314 indicates the portions of table 300 that are updated in this example. The current error count in 306, entry 312, is incremented from 3 to 4 and the associated time in 308 is also updated. A determination is made by the first data storage system as to whether an error message is returned to the host indicating the failed write request. In this example, the current error count is 4 which is less than the threshold counter value of 5. Accordingly, an error message is returned to HOST 1 indicating that the write request has failed. In turn, HOST 1 does not send any new data but retries the same write request. The first data storage system again attempts to first push the data for DEVICE 1 LBA 30 to the second data storage system and fails. In connection with handling the internal processing error, the first data storage system determines entry 312 is a match for the current internal processing error. The current error count of 4 denoted by 314 is updated to 5. The first data storage system compares the updated current error count of 5 to the counter value or threshold and determines that the threshold number of retries has been reached. Accordingly, the first data storage system aborts the session or task associated with maintaining the point in time copy on the second data storage system and does not return an error to HOST 1. Other processing associated with the host I/O or write request may continue. With reference to this example, this processing may include updating existing data included the first data storage system even though the task for maintaining the point in time copy on the second data storage system has been aborted. In this example, an EHP has been defined for HOST 1 in favor of allowing host I/O operations to continue despite reaching a threshold number of internal processing errors associated with maintaining a point in time copy of data.

It should be noted that a counter may be set to a value or threshold in accordance with the number of retries acceptable for a host for a particular data operation.

It should be noted that the processing steps of flowchart 200 may be performed in an embodiment when the counter value or threshold value is a value other than 0 or 1, wherein, the conditions associated with counter values of 0 and 1 are as described elsewhere herein. In the event that the counter value is 1, the ancillary task may always be aborted and an error may never returned to the host in accordance with the internal processing error and error handling policy. In the event that the counter value is 0, all internal processing errors are reported to the host and the ancillary task may not be aborted in accordance with specified conditions of a defined error handling policy. The host may also continuously retry the data operation associated with the internal processing error occurrences.

Although the foregoing example uses a host write operation, an EHP may be used in connection with other host data operations including, for example, a host read operation.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing error handling in accordance with an error handling policy in a data storage system comprising:
   receiving, at the data storage system, error handling criteria including a threshold condition;
   receiving, at the data storage system, a data operation request from a host wherein, in response to an internal processing error of the data storage system occurring within a time period in connection with performing an ancillary task associated with the data operation request, an error count is incremented within said time period;
   determining if said threshold condition has been reached;
   processing the internal processing error in accordance with the error handling criteria, wherein, an error condition is returned to the host if said threshold condition has not been reached, wherein said threshold condition includes said error count which is incremented within said time period with each occurrence of said internal processing error within said time period;
   determining whether said error count has been incremented within said time period, wherein if said error count has not been incremented within said time period, it is determined that no internal processing error has occurred within said time period; and
   reinitializing said error count if it is determined that said error count has not been incremented within said time period.

2. The method of claim 1, wherein said error handling criteria includes a first indicator associated with a device of the data operation request corresponding to the internal processing error.

3. The method of claim 2, wherein the device is a physical device or a logical device.

4. The method of claim 2, wherein said error handling criteria includes a second indicator associated with the host issuing the data operation request corresponding to the internal processing error.

5. The method of claim 4, wherein said error handling criteria includes a third indicator associated with a device location included in the data operation request corresponding to the internal processing error.

6. The method of claim 5, wherein the data operation request is a first write operation and the internal processing error occurs as a result of the first data storage system failing to perform a second write operation to a second data storage system prior to performing the first write operation.

7. The method of claim 6, wherein the ancillary task maintains a point in time copy of data from the first data storage system on the second data storage system.

8. The method of claim 5, wherein the error handling criteria is sent from a host to the data storage system using an application programming interface.

9. The method of claim 8, wherein the error handling criteria is specified in accordance with at least one input parameter of the application programming interface.

10. The method of claim 5, wherein the error handling criteria is specified using a configuration file of the data storage system.

11. The method of claim 5, wherein said error handling criteria includes said time period.

12. The method of claim 2, wherein the device is associated with a plurality of error handling policies, each of said plurality of policies having one or more error handling criteria.

13. The method of claim 12, wherein the device is associated with a first error handling policy and a second error handling policy, the first error handling policy including a device indicator and first ancillary task identifier corresponding to a first ancillary task executing in the data storage system, the second error handling policy include the device indicator and a second ancillary task identifier corresponding to a second ancillary task executing in the data storage system.

14. A method for performing error handling in accordance with an error handling policy in a data storage system comprising:
   receiving, at the data storage system, error handling criteria including a threshold condition;
   receiving, at the data storage system, a data operation request from a host wherein an internal processing error of the data storage system occurs in connection with performing an ancillary task associated with the data operation request;
   determining if said threshold condition has been reached; and
   processing the internal processing error in accordance with the error handling criteria, wherein, an error condition is returned to the host if said threshold condition has not been reached, wherein said error handling criteria includes a first indicator associated with a device of the data operation request corresponding to the internal processing error, wherein said error handling criteria includes a second indicator associated with the host issuing the data operation request corresponding to the internal processing error, wherein said error handling criteria includes a third indicator associated with a device location included in the data operation request corresponding to the internal processing error, wherein said threshold condition is a cumulative error count incremented with each occurrence of an internal processing error, said error handling criteria including a time period, said cumulative error count being reinitialized if an internal processing error has not occurred within an amount of time specified by said time period, wherein said error handling criteria includes a timestamp indicator, said timestamp indicator being updated with a current time value each time said cumulative error count is updated, the method further comprising:

determining, using said timestamp indicator, if an internal processing error has occurred within said amount of time.

15. A method for performing error handling in accordance with an error handling policy in a data storage system comprising:

receiving, at the data storage system, error handling criteria including a threshold condition;

receiving, at the data storage system, a data operation request from a host wherein an internal processing error of the data storage system occurs in connection with performing an ancillary task associated with the data operation request;

determining if said threshold condition has been reached; and processing the internal processing error in accordance with the error handling criteria, wherein, an error condition is returned to the host if said threshold condition has not been reached, wherein said threshold condition is an error count incremented with each occurrence of an internal processing error, said error count being reinitialized if said error count has not been incremented within a time period, wherein said internal processing error is a type of internal processing error which the host may elect not to receive in accordance with said error handling criteria, said ancillary task able to produce other internal processing errors of another type about which a host is notified independent of said error handling criteria.

16. A computer readable medium for performing error handling in accordance with an error handling policy in a data storage system, the computer readable medium comprising executable code stored thereon that:

receives, at the data storage system, error handling criteria including a threshold condition;

receives, at the data storage system, a data operation request from a host wherein in response to an internal processing error of the data storage system occurring within a time period in connection with performing an ancillary task associated with the data operation request, an error count is incremented within said time period;

determines if said threshold condition has been reached;

processes the internal processing error in accordance with the error handling criteria, wherein, an error condition is returned to the host if said threshold condition has not been reached, wherein said threshold condition includes said error count which is incremented within said time period with each occurrence of said internal processing error within said time period;

determines whether said error count has been incremented within said time period, wherein if said error count has not been incremented within said time period, it is determined that no internal processing error has occurred within said time period; and reinitializes said error count if it is determined that said error count has not been incremented within said time period.

17. The computer readable medium of claim 16, wherein said error handling criteria includes a first indicator associated with a device of the data operation request corresponding to the internal processing error.

18. The computer readable medium of claim 1, wherein the device is a physical device or a logical device.

19. The computer readable medium of claim 17, wherein said error handling criteria includes a second indicator associated with the host issuing the data operation request corresponding to the internal processing error.

20. The computer readable medium of claim 19, wherein said error handling criteria includes a third indicator associated with a device location included in the data operation request corresponding to the internal processing error.

21. The computer readable medium of claim 20, wherein the data operation request is a first write operation and the internal processing error occurs as a result of the first data storage system failing to perform a second write operation to a second data storage system prior to performing the first write operation.

22. The computer readable medium of claim 21, wherein the ancillary task maintains a point in time copy of data from the first data storage system on the second data storage system.

23. The computer readable medium of claim 20, wherein the error handling criteria is sent from a host to the data storage system using an application programming interface.

24. The computer readable medium of claim 23, wherein the error handling criteria is specified in accordance with at least one input parameter of the application programming interface.

25. The computer readable medium of claim 20, wherein the error handling criteria is specified using a configuration file of the data storage system.

26. The computer readable medium of claim 20 wherein said error handling criteria includes said time period.

27. The computer readable medium of claim 17, wherein the device is associated with a plurality of error handling policies, each of said plurality of policies having one or more error handling criteria.

28. The computer readable medium of claim 27, wherein the device is associated with a first error handling policy and a second error handling policy, the first error handling policy including a device indicator and first ancillary task identifier corresponding to a first ancillary task executing in the data storage system, the second error handling policy include the device indicator and a second ancillary task identifier corresponding to a second ancillary task executing in the data storage system.

29. A computer readable medium for performing error handling in accordance with an error handling policy in a data storage system, the computer readable medium comprising executable code stored thereon that:

receives, at the data storage system, error handling criteria including a threshold condition;

receives, at the data storage system, a data operation request from a host wherein an internal processing error of the data storage system occurs in connection with performing an ancillary task associated with the data operation request;

determines if said threshold condition has been reached;

processes the internal processing error in accordance with the error handling criteria, wherein, an error condition is returned to the host if said threshold condition has not been reached, wherein said threshold condition is an error count incremented with each occurrence of an internal processing error;

determines, using said error count, whether an internal processing error has occurred within a time period, wherein if said error count has not been incremented within said time period, it is determined that no internal processing error has occurred within said time period; and reinitializes said error count if it is determined that no internal processing error has occurred within said time period as indicated when said error count has not been incremented within said time period, wherein said error handling criteria includes a first indicator associated with a device of the data operation request corresponding to the internal processing error, a second indicator associated with the host issuing the data operation request corresponding to the internal processing error, a third indicator associated with a device location included in the data operation request corresponding to the internal processing error, said time period, and a timestamp indicator, said timestamp indicator being updated with a current time value each time said error count is updated, the computer readable medium further comprising executable code stored thereon that:

determines, using said timestamp indicator, if an internal processing error has occurred within said amount of time.

30. A computer readable medium for performing error handling in accordance with an error handling policy in a data storage system, the computer readable medium comprising executable code stored thereon that:

receives, at the data storage system, error handling criteria including a threshold condition;

receives, at the data storage system, a data operation request from a host wherein an internal processing error of the data storage system occurs in connection with performing an ancillary task associated with the data operation request;

determines if said threshold condition has been reached;

processes the internal processing error in accordance with the error handling criteria, wherein, an error condition is returned to the host if said threshold condition has not been reached, wherein said threshold condition is an error count incremented with each occurrence of an internal processing error;

determines, using said error count, whether an internal processing error has occurred within a time period, wherein if said error count has not been incremented within said time period, it is determined that no internal processing error has occurred within said time period; and reinitializes said error count if it is determined that no internal processing error has occurred within said time period as indicated when said error count has not been incremented within said time period, wherein said internal processing error is a type of internal processing error which the host may elect not to receive in accordance with said error handling criteria, said ancillary task able to produce other internal processing errors of another type about which a host is notified independent of said error handling criteria.

31. A method for performing error handling in accordance with an error handling policy in a data storage system comprising:

receiving, at the data storage system, error handling criteria including a threshold condition;

receiving, at the data storage system, a data operation request from a host wherein an internal processing error of the data storage system occurs in connection with performing an ancillary task associated with the data operation request;

determining if said threshold condition has been reached; and processing the internal processing error in accordance with the error handling criteria, wherein, an error condition is returned to the host if said threshold condition has not been reached, wherein said error handling criteria includes a first indicator associated with a device of the data operation request corresponding to the internal processing error, wherein said error handling criteria includes a second indicator associated with the host issuing the data operation request corresponding to the internal processing error, wherein said error handling criteria includes a third indicator associated with a device location included in the data operation request corresponding to the internal processing error, wherein said error handling criteria includes a range of device locations associated with said first indicator for a device.

32. A computer readable medium for performing error handling in accordance with an error handling policy in a data storage system, the computer readable medium comprising executable code stored thereon that:

receives, at the data storage system, error handling criteria including a threshold condition;

receives, at the data storage system, a data operation request from a host wherein an internal processing error of the data storage system occurs in connection with performing an ancillary task associated with the data operation request;

determines if said threshold condition has been reached;

processes the internal processing error in accordance with the error handling criteria, wherein, an error condition is returned to the host if said threshold condition has not been reached, wherein said threshold condition is an error count incremented with each occurrence of an internal processing error;

determines, using said error count, whether an internal processing error has occurred within a time period, wherein if said error count has not been incremented within said time period, it is determined that no internal processing error has occurred within said time period; and reinitializes said error count if it is determined that no internal processing error has occurred within said time period as indicated when said error count has not been incremented within said time period, wherein said error handling criteria includes a first indicator associated with a device of the data operation request corresponding to the internal processing error, a second indicator associated with the host issuing the data operation request corresponding to the internal processing error, a third indicator associated with a device location included in the data operation request corresponding to the internal processing error, and a range of device locations associated with said first indicator for a device.

* * * * *